Patented Jan. 15, 1924.

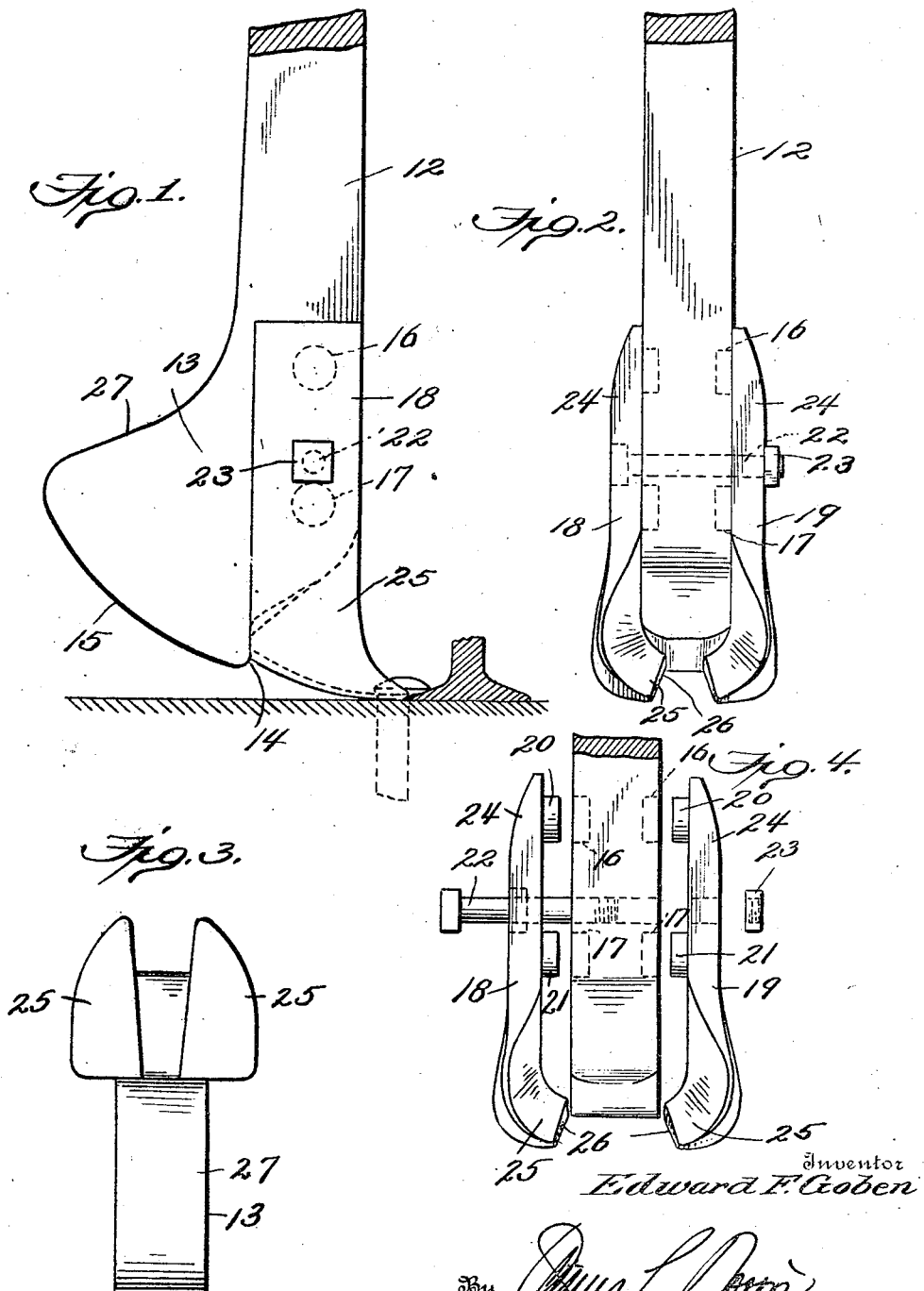

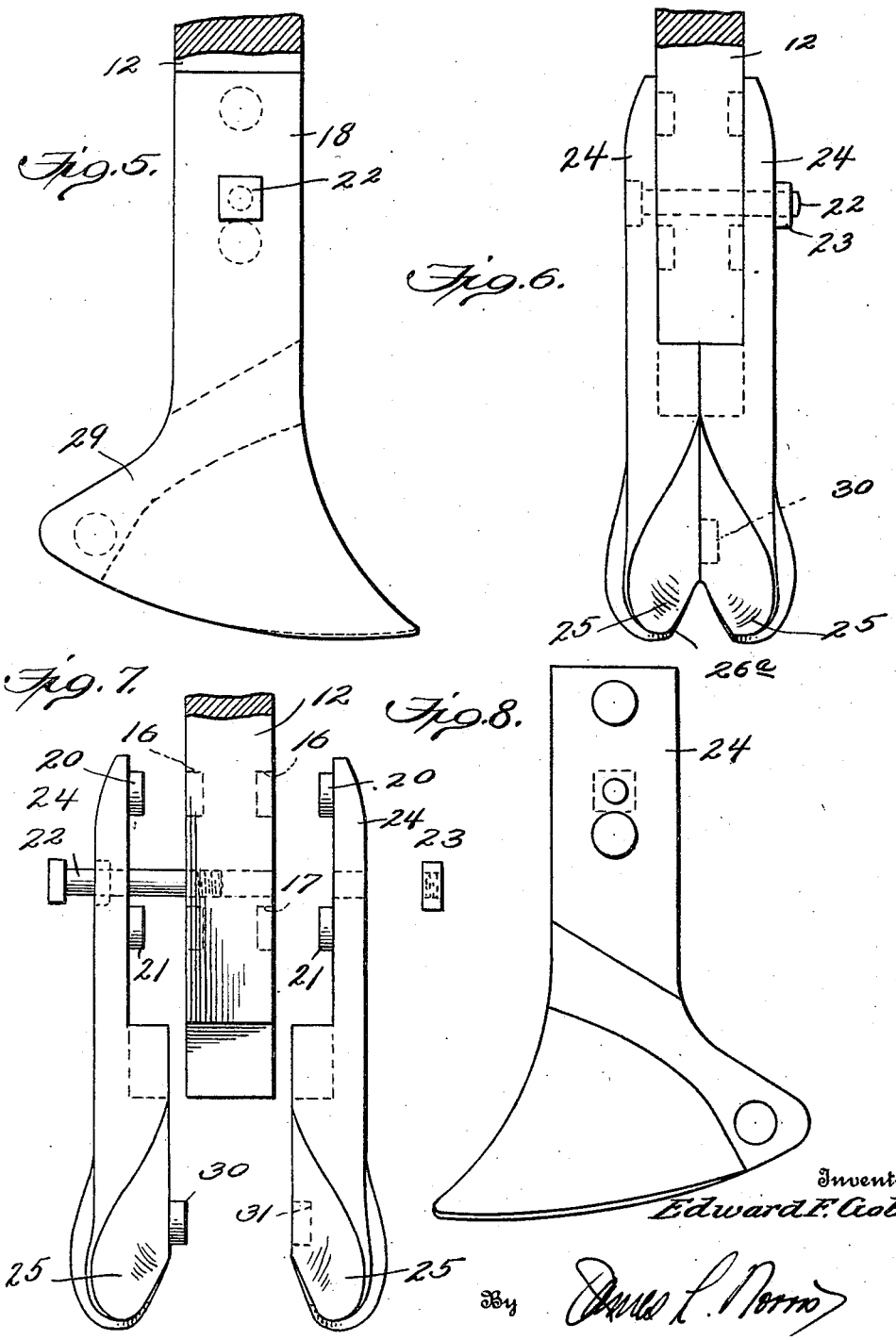

1,481,131

UNITED STATES PATENT OFFICE.

EDWARD FISHER GOBEN, OF MUSKOGEE, OKLAHOMA.

SPIKE PULLER.

Application filed June 16, 1922. Serial No. 568,753.

*To all whom it may concern:*

Be it known that I, EDWARD F. GOBEN, a citizen of the United States, residing at Muskogee, in the county of Muskogee and State of Oklahoma, have invented new and useful Improvements in Spike Pullers, of which the following is a specification.

The present invention relates to nail or spike pullers of the type in which there are assembled claws removably attached to a handle bar. Objects of the invention are simplicity of construction; cheapness of manufacture; rigidity and durability of the assembled construction; facility and economy of repairs and the elimination of parts which are likely to get lost. Other objects are the provision of a spike puller in which there is an extended fulcrum surface, the front edge of which may be brought into close relation to the spike or nail to be pulled.

Referring to the drawings which constitute a part of the present application:—

Figure 1 illustrates one form of the invention in which the fulcrum portion of the device is made integral with the handle bar and the claws are separably attached to the bar by means of a bolt, the device being illustrated in its initial position in lifting a spike off the flange of a railroad iron.

Figure 2 is a front elevation of the spike puller illustrated in Figure 1.

Figure 3 shows a bottom plan view of the claw in connection with the fulcrum member.

Figure 4 illustrates a portion of the handle bar and the claws in detached relation thereto.

Figure 5 illustrates a somewhat different embodiment of my invention in which the fulcrum member and the claws are made integral and are separately attached to the handle.

Figure 6 is a front elevation of the same.

Figure 7 is a view similar to Figure 4 showing the claws detached from the handle.

Figure 8 shows a single detached claw and fulcrum.

I will now refer to the drawings in detail the same reference characters designating the same parts throughout the drawings;

12 designates a handle which may be of any suitable length and which preferably tapers slightly toward its upper end. The handle is provided on its lower end with a rearwardly curved elbow 13, which is shouldered at 14 and which is provided with an extended curved fulcrum surface 15. The handle is provided adjacent the elbow on both sides thereof with spaced depressions 16 and 17 and secured to the sides of the handle are claws 18 and 19. The claws are provided with securing portions 24 adapted to fit against the handle with portions carrying lugs 20 and 21 so located that they will fit in the depressions 16 and 17 when the claws are in position on the handle. When so positioned the claws may be secured to the handle by means of a bolt 22 and a nut 23, the head of the bolt being preferably countersunk into the side of the claw members. The claw portions proper are formed on the lower ends of the members 24 by curving the same inwardly to form claw members 25, the inner edges 26 of which, when the claws are assembled with the handle, form a rearwardly converging notch ended by the shoulder 14. The lower surfaces of the claws are curved rearwardly and upwardly said curvature being substantially continued in the fulcrum surface 15 to a considerable distance in the rear of the shoulder 14, to afford an extended fulcrum surface.

In operating with this device, the spike is first loosened by slipping the claws under the head of the spike and bearing down on the surface of the claws until the spike is sufficiently raised to receive the claws more completely thereabout. Further rearwardly turning movement of the handle will bring the curved fulcrum surface proper into play so that the spike may be readily drawn. It will be noted that the pivot point will in this manner be constantly removed further from the claws giving greater leverage as the spike is lifted. It will also be noted that in the above construction the claws may be readily assembled with or removed from the handle by the removal of the single bolt and upon one of the claws becoming damaged the same may be replaced without necessitating the renewal of the whole construction. A further point should be noticed that the rearwardly curved shoulder affords a surface at 27 which may be struck a blow to force the claws under the spike head.

In the construction shown in Figures 5 to 8 inclusive the fulcrum surface is made integral with and as a continuation of the claw members. The edges 26ª of the notch converging rearwardly to a point and the rear portions of the claws contacting with each other over a considerable surface 29 upon one of which surfaces is formed a lug 30 and upon the other a corresponding depression 31 into which said lug fits.

This embodiment of my device is particularly useful where the fulcrum member 13 is subjected to a great deal of wear due to the necessity of knocking the same to force the claws under the spike heads and by which the fulcrum member may become worn and ineffective. In such case with this construction the renewal of the fulcrum member may be accomplished without also renewing the handle.

I claim as my invention:

1. A spike puller comprising a handle having claws detachably secured to one end thereof, lugs on said claws, said handle having depressions therein corresponding to said lugs whereby the claws may be attached to the handle with a single bolt, and a fulcrum member extending rearwardly from said claws and having a curved fulcrum surface at the end thereof.

2. A spike puller comprising a handle having a rearwardly extending shoulder at its lower end, a curved surface at the lower end of said shoulder, a pair of claws separably secured to said handle having rearwardly converging spaced edges forming a notch terminated by the front end of said fulcrum surface.

3. A spike puller comprising a handle, a pair of members secured to the lower end of said handle having claws extending forwardly therefrom, and portions integral with said members extending rearwardly from said claws to form a fulcrum, and integral interlocking means on said rearwardly extending portions.

In testimony whereof I have hereunto set my hand in presence of two subscribing witnesses.

EDWARD FISHER GOBEN.

Witnesses:
   J. R. Sevall,
   W. Randolph.